May 8, 1962 A. S. HOAGLAND ET AL 3,034,111

DATA STORAGE SYSTEM

Filed Nov. 24, 1958 4 Sheets-Sheet 1

INVENTORS.
ALBERT S. HOAGLAND
LEONARD D. SEADER

BY Robert H. Fraser

ATTORNEY

May 8, 1962 A. S. HOAGLAND ET AL 3,034,111

DATA STORAGE SYSTEM

Filed Nov. 24, 1958 4 Sheets-Sheet 2

INVENTORS.
ALBERT S. HOAGLAND
LEONARD D. SEADER
BY Robert H. Fraser
ATTORNEY

May 8, 1962 A. S. HOAGLAND ET AL 3,034,111

DATA STORAGE SYSTEM

Filed Nov. 24, 1958 4 Sheets-Sheet 3

INVENTORS.
ALBERT S. HOAGLAND
LEONARD D. SEADER

BY Robert H. Fraser

ATTORNEY

DATA STORAGE SYSTEM

Filed Nov. 24, 1958 4 Sheets-Sheet 4

INVENTORS.
ALBERT S. HOAGLAND
LEONARD D. SEADER

BY [signature]

ATTORNEY

United States Patent Office 3,034,111
Patented May 8, 1962

3,034,111

DATA STORAGE SYSTEM

Albert S. Hoagland, Palo Alto, and Leonard D. Seader, Saratoga, Calif., assignors to International Business Machines Corporation, New York, N. Y., a corporation of New York Filed Nov. 24, 1958, Ser. No. 776,051
13 Claims. (Cl. 340—174.1)

This invention relates to information recording and reproducing systems, and more particularly to random access memory systems which utilize rotating discs as a storage medium.

In data processing and computing systems, information is frequently stored by recording the information and selectively reproducing the information when it is to be used. In one type of memory system for the storage of information, discrete areas of a recording medium are magnetized in accordance with electrical signals. In one such memory system, a rotating disc having a magnetizable surface is employed to store a relatively large amount of information in a relatively small space.

One magnetizable disc memory system which has been particularly successful utilizes a number of magnetizable discs mounted on a rotatable common shaft and slightly spaced apart along the shaft. As the discs are rotated, transducers may be interposed between the discs to selected positions relative to the surfaces of the discs for either recording or reproducing information. A great amount of information can be stored with this system with relatively easy and quick accessibility of the information. Although this system is eminently suitable for many uses, an increase in the density with which the information is recorded is practically always desirable, if the same accuracy can be maintained. Clearly, the greater the amount of information which can be stored on a given unit of area of recording surface, the greater the capacity of the system. Furthermore, with a greater density of information on the disc, there may be a concomitant increase in the speed of operation of the system, as well as a decrease in the cost of storing a given amount of information.

In increasing the number of bits, or binary digits, per unit of recording surface area, it is possible either to increase the number of bits of information along a given track, or to increase the number of adjacent tracks within a given area. The number of tracks within a given area is dependent in large measure upon the accuracy with which a magnetic transducer or transducing head can be positioned with respect to a given track. The positioning of a transducer selecting one of several tracks must be done very accurately, inasmuch as virtually no errors can be tolerated in most types of data processing systems. The positioning must nevertheless be done with as much speed as possible in order to keep the access time for recording or deriving information from a given location at a minimum. Although a number of positioning techniques have been employed, known arrangements generally are compromises between the different desirable features, such as access time, precision, and the amount of additional equipment required.

A further desirable feature which, if utilized, greatly increases the demands upon a transducer positioning system is the use of interchangeable recording discs. If different discs may be used at will with the same positioning and driving assembly, it becomes apparent that the flexibility and capacity of the system is greatly increased.

It is therefore an object of this invention to provide an improved random access memory system having a transducer positioning mechanism which is capable of more accurate operation than the mechanisms heretofore available.

It is another object of this invention to provide an improved recording technique for increasing the track density of information on a storage medium.

It is yet another object of this invention to provide a superior form of magnetic recording disc.

A further object of this invention is to provide a highly accurate, fast and reliable mechanism for positioning transducers in a random access memory utilizing at least one rotating disc.

A still further object of this invention is to provide an improved referencing system for arrangements which have information recorded in coordinate configurations.

An additional object of this invention is to provide an improved servo system for extremely fast and accurate control of a positioning mechanism.

These and other desirable objects may be achieved in accordance with this invention by the use of a single magnetic disc together with a ganged magnetic transducer head assembly. On the surface of the disc there is provided a synchronizing track and a reference pattern comprised of a number of checkerboard-type matrices. The matrices extend radially outward at different spaced circumferential points to define a reference pattern concentric with the disc and information tracks are positioned outwardly from the reference patterns. A plurality of individual transducers are equally spaced relative to the disc and have a fixed spatial relation to each other. Each of the checkerboard patterns is defined by elemental surface segments of alternately differing magnetic characteristics with the radial locations of the differing segments being used to control the track positions of the ganged head assembly. Each matrix, moreover, may consist of two checkerboards, or sample groups, which are radially displaced an incremental amount with respect to each other. In positioning the ganged head assembly, there is first a coarse positioning in the approximate radial location which is desired, at which a servo tranducer head is in operative relation to the reference patterns. A fine positioning system then samples the signals detected by the servo transducer taken from only one, in this example, of the sample groups of each of the individual matrices. By using signals from only one of the incrementally displaced sample groups, relatively large areas are made available for purposes of distinguishing position, and the coarse positioning mechanism can thereby operate with a wider tolerance and error signals can be readily generated to control the direction and extent of movement of the fine positioning system through an associated servo device.

In accordance with another feature of this invention, a sampled data control technique is employed in which a sampled data control system utilizes signals developed by a synchronizing track and by the reference patterns on the disc to develop sequences of error pulses which indicate by magnitude and polarity the direction and extent of movement of the positioning mechanism which is required. This arrangement operates in conjunction with the coarse positioning mechanism and derives the full advantages of the reference patterns which are employed.

A better understanding of the invention may be had from a reading of the following detailed description and an inspection of the drawings, in which like reference numerals refer to like parts, and in which.

A system which employs a number of magnetic discs mounted on a common shaft for random access memory apparatus is described in a copending application entitled "Data Storage Apparatus," filed May 14, 1956, in the name of Jacob J. Hagopian, Serial Number 584,705. The system therein described utilizes both a coarse positioning mechanism and a fine positioning mechanism to provide fast and accurate positioning of the storage transducer heads in which a phasing relationship is employed together with a separate group of phasing tracks on one of the disc faces. The phasing tracks are arranged in pairs and each pair is disposed in a fixed relation to different ones of the storage tracks on the remainder of the discs. This arrangement is such that when a phasing transducer is located precisely between two of the phasing tracks, opposing signals are induced in the phasing transducer to provide a null. Otherwise, when the phasing transducer is slightly out of position, an error signal is induced which indicates by its magnitude and polarity the correction which is necessary in the position of the transducer heads to attain the desired track location. This arrangement operates to provide a continuous null seeking action. The copending application identified above is illustrative of systems which utilize coarse and fine positioning, together with servo control of the transducer heads.

Figure 1:
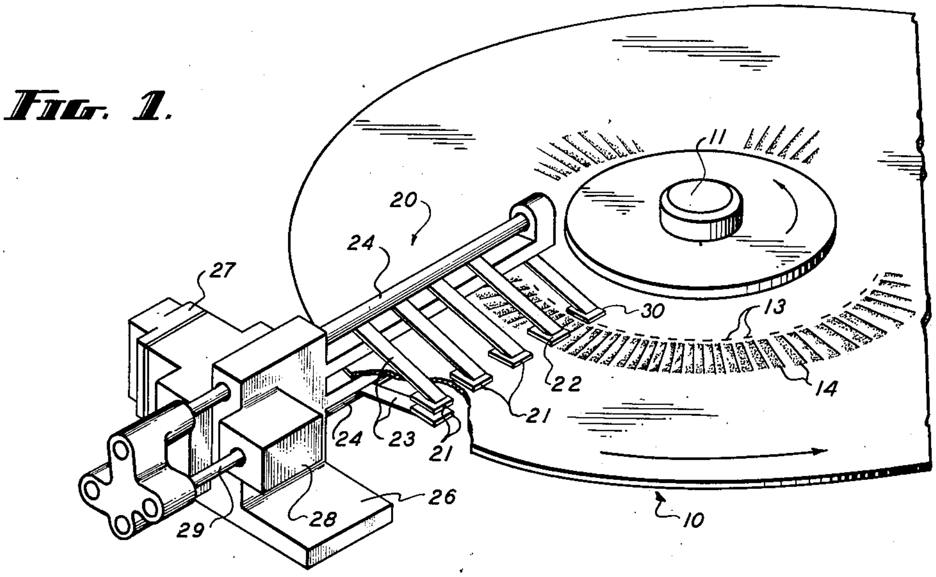
FIG. 1 is a perspective view of a portion of a magnetic disc recording system in accordance with the invention utilizing checkerboard reference patterns and a ganged transducer head assembly.
Figure 2:
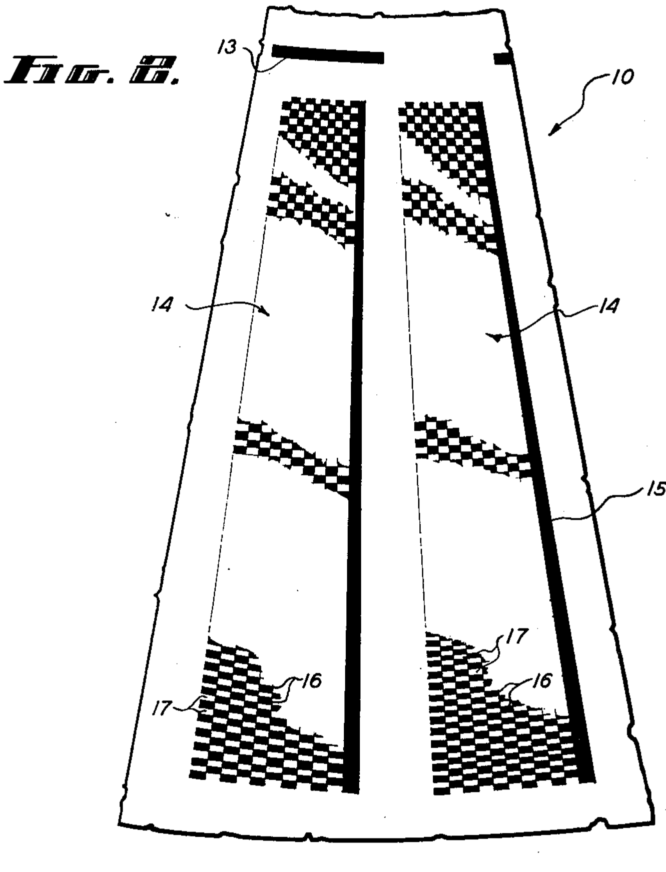
FIG. 2 is an enlarged fragmentary view of the reference patterns of FIG. 1, showing two sample groups defining a reference matrix and a synchronizing or timing sector.

It is desired in the present device, however, to substantially increase the density of the tracks of recorded information on magnetic discs. A general example of how this may be accomplished is illustrated in FIGS. 1 and 2 in which the principal mechanical portion of the arrangement includes a disc 10, a principal portion of the opposite surfaces of which may be coated with a suitable material to provide a magnetizable recording surface. The disc 10 may be mounted on a shaft and hub mechanism 11 for rotation about the central axis of the disc 10. Further examples of the driving element which may be used are not provided here, inasmuch as they may be of any of several forms, or of the form indicated in the above referenced copending application.

Positioned on the disc 10, about and concentric with the center of the disc 10, are a number of synchronizing or timing track sectors 13. The synchronizing sectors 13 define linear segments about the disc 10 and are positioned at a relatively short radius thereon. Positioned at a further radius from the center of the disc 10 are a number of radial reference pattern segments 14. Each of these segments 14 comprises what will hereafter be referred to as "a sample group," each of which consists of a substantially checkerboard pattern of magnetized and non-magnetized areas 16 and 17 respectively (FIG. 2). While the areas 16 and 17 are shown as being characterized by magnetization, it will also be understood that light reflecting properties could also be employed. With such arrangements, light sensitive elements would provide positional information.

Each of the sample groups 14 includes one like radial boundary 15, positioned at the leading edge of the sample group 14, when viewed from the standpoint of a stationary member external to the disc 10. It should be noted that the magnetized and non-magnetized areas 16 and 17 respectively vary somewhat in size and shape with the relative position of the area 16 or 17. Each of the elemental areas 16 or 17, however, has the same radial dimension. A complex structure of this type is best provided by a precision technique, such as a photo-etching process which removes a small depth of the surface at areas to be magnetized. This technique can provide precise alignment of elemental areas, accurate dimensions, and proper central location of the areas 16 and 17 with respect to the disc 10. After photo-etching, magnetizable powder or other magnetic material may be inserted into the relieved portions, held in place by binder material or other means, and magnetized to have the desired polarity, here assumed to be positive.

With this arrangement there way be employed a servo-controlled ganged transducer head assembly 20 having a number of separate transducers 21 for the recording and reproducing of stored information and a separate servo transducer head 22 associated with the servo reference patterns. Here again, and throughout the specification, it will be recognized that light sensitive transducer elements may be employed to generate the reference signals. The light sensitive element used as a servo transducer would likewise be ganged with the information transducers 21. Seven of the information transducers 21 are here shown, three of these being associated with and spaced radially outwardly from the servo transducer 22, and the remaining four being similarly spaced, on the opposite side of the disc 10. The radial spacings of the information transducer heads 21 with respect to each other and to the servo transducer 22 are equal, so that each of the information transducers 21 operates to record on and reproduce from a like radial storage area.

The transducers 21 and 22 are coupled to a pair of positioning piston arms 24 through individual transducer mounting arms 23. The electrical connections from the transducers 21 and 22, and details as to the transducers themselves, may be conventional, and have been omitted here for clarity and simplicity. Each of the positioning piston arms 24 is mounted in a base structure 26 so as to move radially with respect to the disc 10. The base structure 26 contains a hydraulic positioning piston (not visible in FIG. 1) for moving the arms 24 in and out. The position of the piston arms 24 with respect to the disc 10 is determined by a servo valve 27 mounted in the base 26 and acting upon the hydraulic positioning piston. The servo valve 27 may be of any of the types available in the art, the actuation of the valve 27 being described in greater detail below.

Thus, a ganged transducer head assembly 20 may be seen to be provided by the positioning piston arms 24, and the mounting arms 23 coupling the individual transducers 21 and 22 to the positioning piston arms 24. The relative coarse radial position of the ganged head assembly 20 with respect to the disc 10 is sensed by a linear differential transformer 28, which may include a movable core mounted within a coil. The shaft 29 for the core is in fixed relation to, and movable with, the ganged head assembly 20 through mechanical couplings to the piston arms 24 and the servo valve 27. The transformer 28 operates in response to signals from a source (not shown) to provide a signal indicative in amplitude of the position of the ganged transducer head assembly 20.

A separate synchronizing transducer head 30 is mounted in fixed relation to the disc 10 on a support arm 23. The synchronizing or timing head 30 is in operative relation with the individual segments 13 of the synchronizing track. As with the servo transducer 22, the synchronizing transducer 30 may be a light sensitive transducer. In this sense, therefore, the transducing operation may be considered to include a number of different forms of energy conversion. Circuit connections and details of the head 30 construction will be understood by those familiar with the art, and have been omitted for clarity, as have details of the linear differential transformer 28.

Having described the reference patterns 14, the ganged head assembly and the nature of the positioning mechanism generally, the arrangement of the sample group reference patterns 14 may be considered in greater detail. In this connection, some of the terms employed below should be defined. Each sample group 14 is one of two, in this example, which are associated in a matrix, which may also be called a bit matrix. This may be seen best in FIG. 3, which illustrates the relative radial position of three successive sample groups 14. From FIG. 3 it may be seen that the second sample group 14 of one matrix is offset radially with respect to the first sample group 14 in its matrix, and in like fashion to the first sample group 14 of the succeeding matrix. This relationship is an important feature, and is described in greater detail below. The amount of the sample group offset is equal to the track width of the storage tracks on the disc 10.

The radial coordinate direction defines the location of the different servo tracks, while the sample groups 14 are displaced in the circumferential coordinate direction. Inasmuch as the size of the individual magnetized and nonmagnetized areas 16 and 17 is minute, we may speak of the radial coordinate and the circumferential coordinate as being substantially normal to each other. Information tracks are selected according to the radial coordinate, and sample group selections are concurrently made of the successive sample groups 14 in the circumferential coordinate. As may be seen in FIG. 3, uniformly magnetized radial boundaries 15 are employed for each of the sample groups 14. The magnetized portion 13 of the synchronizing track alternates with successive sample groups 14, with the magnetized portions 13 falling in like sample groups 14 of each of the matrices.

*General System Operation*

The system as a whole includes the ganged head assembly and the recording disc, a coarse positioning control, a fine positioning control, the servo positioner, and the necessary interrelated circuitry. The system cooperates with external circuitry, which will not be described in detail, but which provides the necessary controlling signals and which accomplishes the reading and recording of the information which is to be handled.

Figure 4:
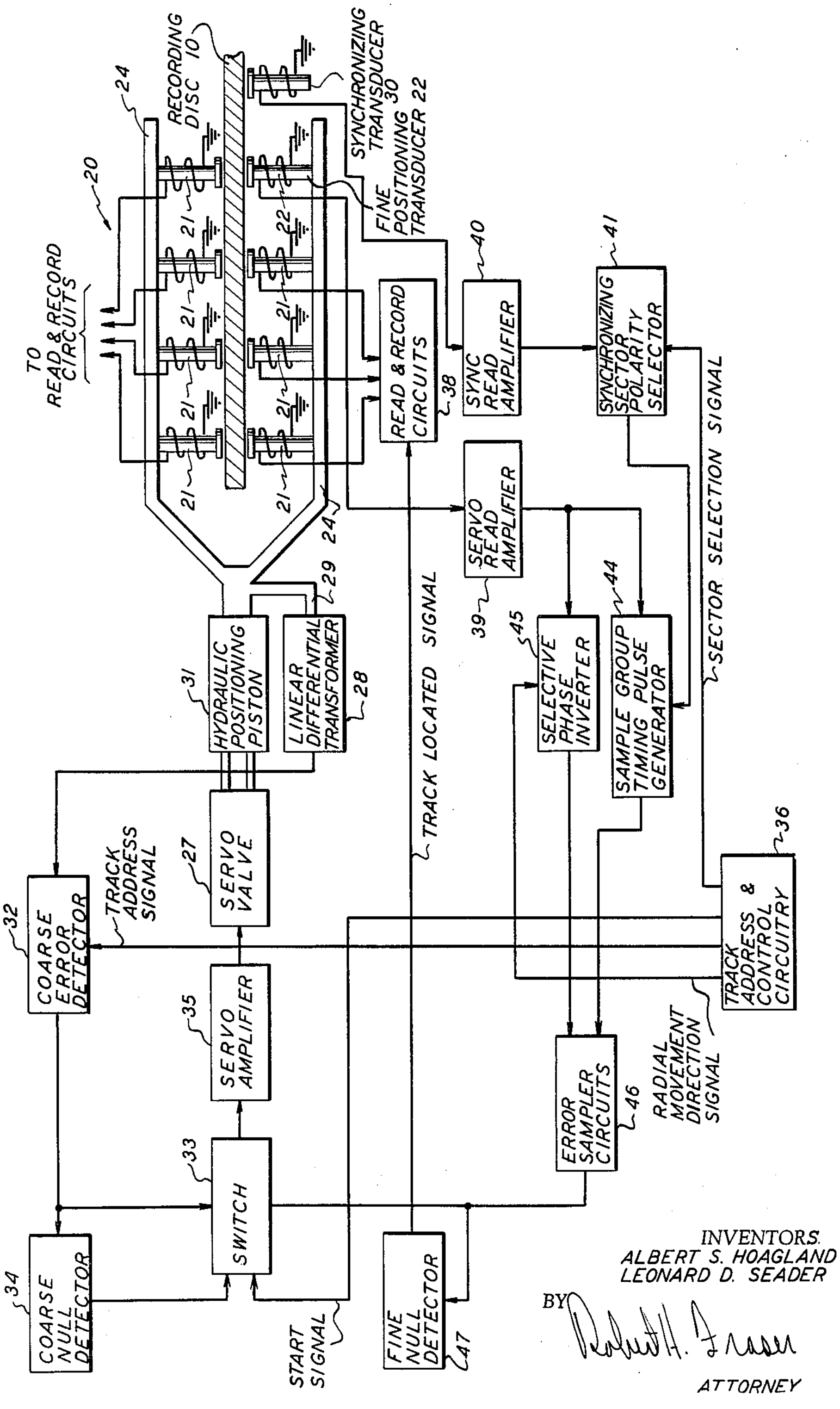
FIG. 4 is a diagrammatic illustration of a magnetic head positioning system in accordance with the invention, utilizing a coarse positioning system and a data sampling system for fine access and positioning.

The system arrangement may best be understood by reference to FIG. 4, which shows in simplified form the arrangement of the recording transducers 21 which deal with stored information, together with the servo transducer 22 and the synchronizing transducer 30. Each of these transducers 21, 22 or 30 is associated with information storage tracks, the reference patterns 14 or the synchronizing segments 13 on the recording disc 10. The arms 24 from a hydraulic positioning piston 31 move the ganged head assembly 20 together in a radial direction with respect to the disc 10 under control of a servo valve 27. The linear differential transformer 28 is actuated in response to movement of the positioning piston 31 through the associated shaft 29 which supports the core within the transformer 28.

Accordingly, in well known fashion, the transformer 28 generates a signal, the amplitude of which is representative of the relative radial position of the ganged head assembly 20. Signals from the differential transformer 28 are applied through a coarse error detector circuit 32 and a switch 33 to the servo amplifier 35. The servo amplifier 35 applies control signals to the servo valve 27, thus completing what may be called the coarse servo loop. The coarse error detector circuit 32 also receives track address signals from the track address and control circuitry 36 which is external to the system. Circuitry such as the track address and control circuitry 36 may be associated with a data processing system with which the present invention is employed. A track address signal may be provided in analog form for the coarse error detector circuit 32 to achieve the comparison which is desired, again in accordance with well known techniques. Signals from the coarse error detector circuit 32 are also applied through a coarse null detector circuit 34 to a set input of the switch 33. As the coarse positioning system operates, the output of the coarse error detector 32 tends toward a null, and when this condition is almost reached, the coarse null detector circuit 34 provides an output to the switch 33, switching the system to the fine position mode of operation. The track address and control circuitry 36 maintains the necessary relationships between these circuits, as indicated by the start signal which is also applied to the switch 33 from the track address and control circuitry 36.

The coarse servo arrangement can be of conventional form, and as a consequence need not be described in detail. When in operation, the coarse servo loop operates continuously to derive its error signal and to establish the necessary correcting signals. Also conventional, and external to the present arrangement, are read and record circuits 38 which utilize the information derived from the information transducers 21. These read and record circuits 38 need not be more fully described, except to point out that they are activated when the desired track has been located, as determined by the presence of a null in the fine positioning servo loop.

Signals from the fine positioning servo transducer 22 and the synchronizing transducer 30 are applied to a servo read amplifier 39 and a synchronizing read amplifier 40 for application to the fine positioning portion of the system. The nature of the principal units within the fine positioning portion will be indicated generally in connection with FIG. 4. A synchronizing sector polarity selector circuit 41 is responsive to signals from both the synchronizing signal read amplifier 40 and the track address and control circuitry 36. The polarity selector 41 operates to select which of the sample groups 14 of a matrix is to be used for purposes of control. Because of the arrangement of the synchronizing segments 13 on the recording disc 10, the synchronizing transducer 30 provides alternate positive and negative pulses as it traverses from a magnetized synchronizing segment 13 to the adjacent non-magnetized area. Accordingly, a simple binary choice based on the polarity of the pulses is in this instance sufficient to control the selection of sample groups. The signals which accomplish the selection are here called "odd" and "even" sample signals.

Signals from the servo read amplifier 39 as well as the polarity selector 41 are applied to a sample group timing pulse generator 44. The sample group timing pulse generator 44 generates a timed sequence of pulses at a given interval following the occurrence of selected synchronizing pulses and the first subsequent pulse of a sample group from the servo transducer. The timing pulse series from the generator 44 is used to sample particular sample groups, within the matrices, as well as particular portions of the pulses within the sample group. Also responsive to signals from the servo read amplifier 39 is a selectively operable phase inverter circuit 45. The phase inverter 45 operates in response to "radial movement direction" signals from the track address and control circuitry 36 either to pass the servo read amplifier 39 signals without inversion or in effect, to invert those signals. The function thus provided governs the direction in which the servo operates the ganged head assembly 20. The polarity desired for a chosen direction of radial movement with respect to the disc 10 is indicated by the track address and control circuitry 36.

Signals from both the selective phase inverter 45 and the sample group timing pulse generator 44 are applied to error sampler circuits 46. The error sampler circuits 46 include means for averaging the series of pulses provided and means for generating a continuous signal between successive groups and applies these signals through the switch 33 to the servo amplifier 35 when the fine positioning system is set into operation. Outputs from the error sampler circuits 46 are also applied to a fine positioning null detector 47, which provides a signal to activate the read and record circuits 38 when a null is present in the fine positioning system output.

The coarse positioning system is activated first, to place the ganged head assembly 20 in the approximate position desired for reading or recording. The fine positioning system is then set into operation, with appropriate "odd" or "even" sector sample signals to select which of the sample groups 14 in the matrices are to be employed and radial movement direction signals to control which way the ganged head assembly 20 is to be moved for a given error signal. Thereafter, sample series of timed pulses are taken from the outputs of the fine positioning transducer 22, and the series are averaged and utilized to generate a substantially continuous signal of step or staircase form for application to the mechanical movement portion of the servo system. The mechanical movement portion is therefore utilized twice, once each by the coarse and fine positioning servo systems.

*Use of the Sampled Data Control System for Fine Positioning*

Figures 3, 6:
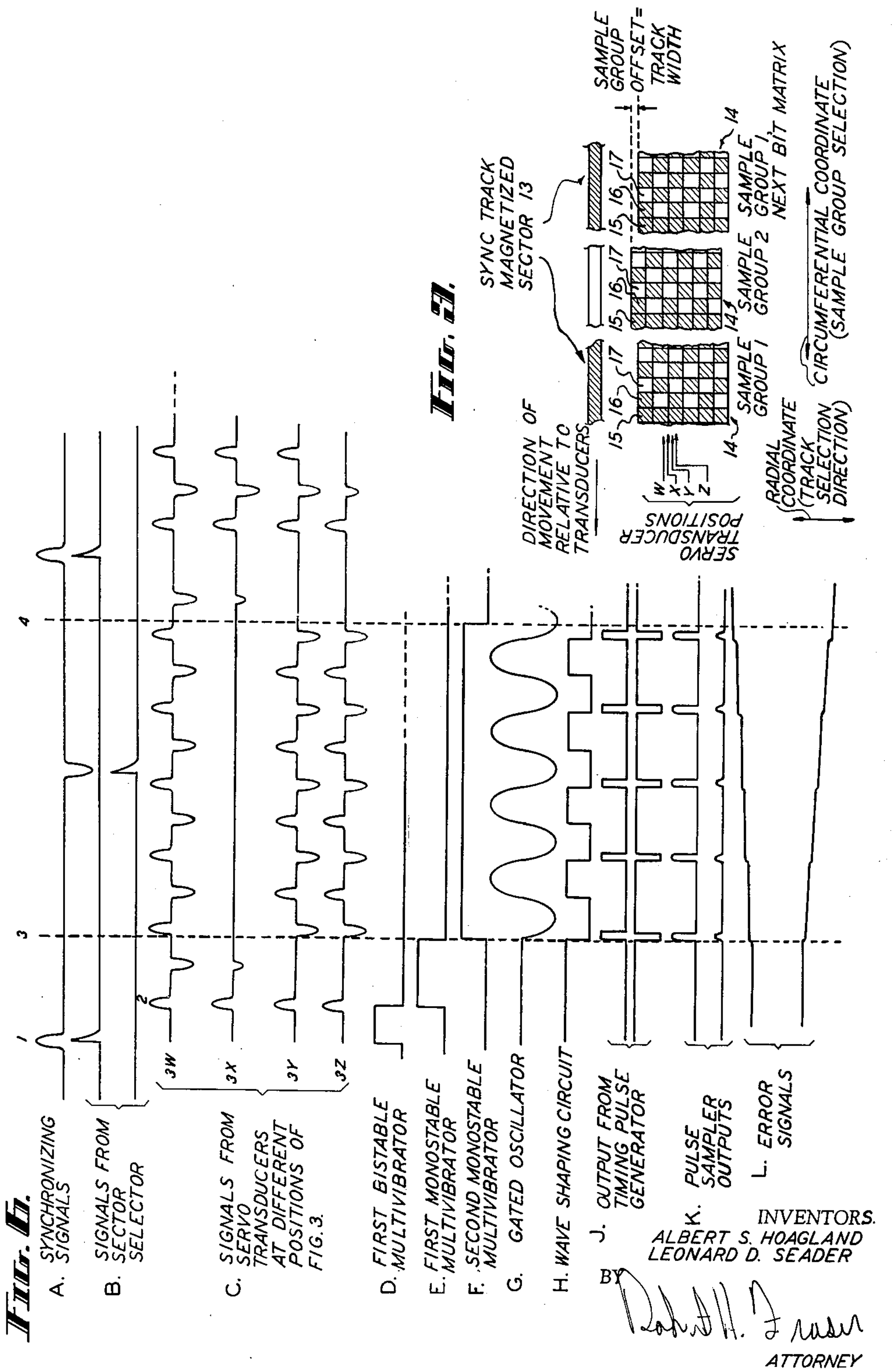
FIG. 3 is an enlarged fragmentary view of the elemental areas utilized within separate sample groups of adjacent matrices, and showing the radial disposition of the sample groups with respect to each other.
FIG. 6 is a set of graphical illustrations showing the relative times of occurrence of signals occurring within the arrangement of FIG. 5.
Figure 5:
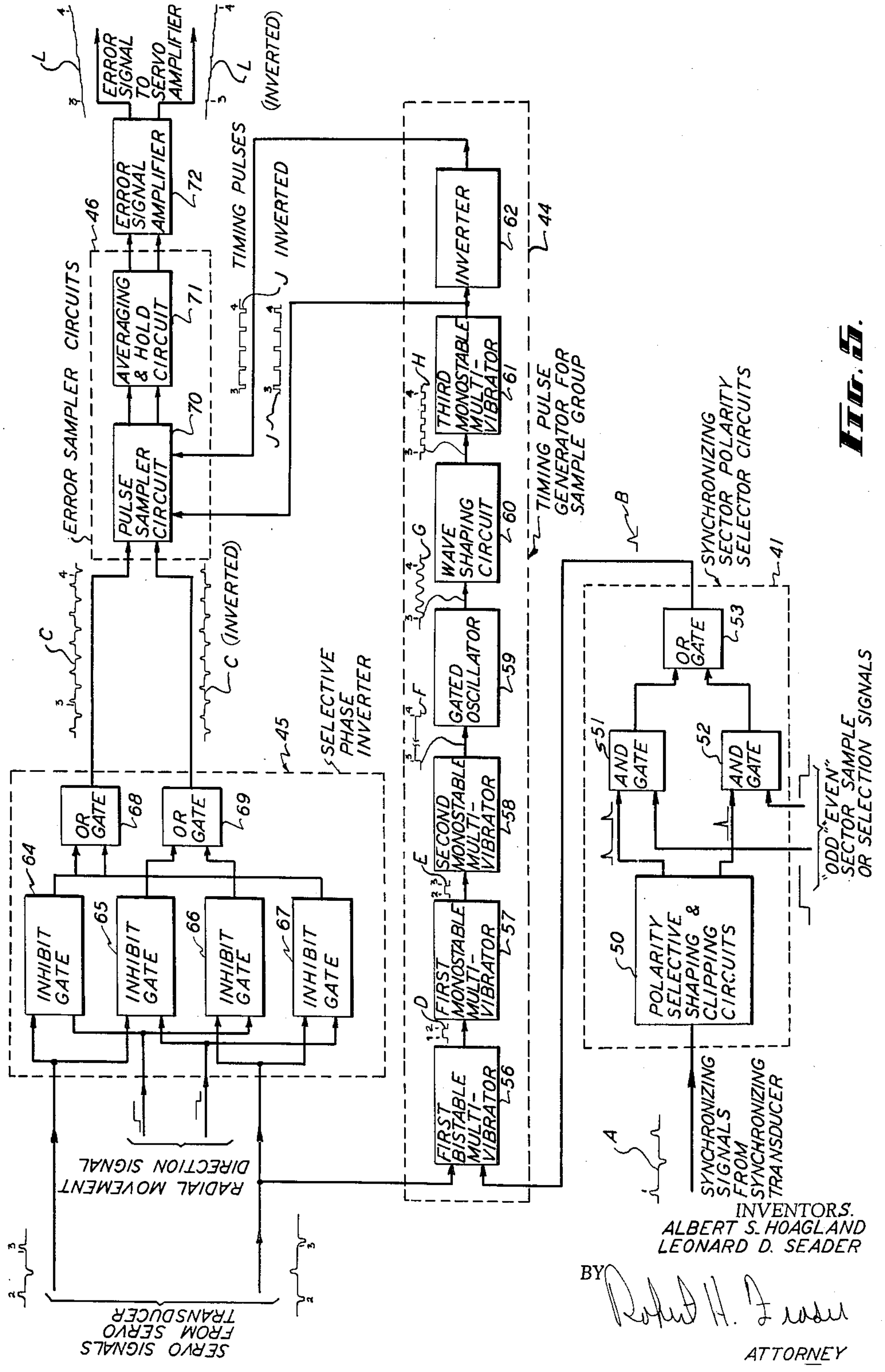
FIG. 5 is a block diagram of a data sampling arrangement which may be employed in the arrangement of FIG. 4.

The fine positioning system which is a part of the system of FIG. 4 may be better understood by reference to FIGS. 5 and 6. The block diagram of FIG. 5 is arranged to correspond to the principal circuit blocks utilized for fine positioning in FIG. 4. The signals provided to and from this circuit are identified to correspond to the like signals in the arrangement of FIG. 4. The binary choice signals for sector selection and radial movement are, however, shown as occurring on two inputs instead of one. A number of features and details of the arrangement of FIG. 5 will be considered in detail below.

Some of the elements of FIG. 5 are identified as "AND" or "OR" gates and other elements are identified as bistable or monostable multivibrators. Such designations are widely employed in the data processing art and are intended to refer to elements which are well known. Further, the use of amplifiers, pulse shapers and inverters should be understood as applying throughout wherever necessary.

FIG. 6, consisting of waveforms 6A through 6L, is representative of the signal waveforms occurring at like designated points in the arrangement of FIG. 5.

It is assumed at the outset, in this description of the arrangement of FIG. 5, that the servo signals are provided from the servo transducer head 22 associated with the reference patterns 14 on the disc 10 (of FIG. 1), and that synchronizing signals are provided from the synchronizing transducer 30. Further, appropriate sector sample signals and radial movement direction signals are provided from the track address and control circuitry 36 of FIG. 4. Operation of this system is then initiated by the synchronizing signals, having waveform 6A (FIG. 6) applied to the synchronizing sector polarity selector 41. As may be seen in waveform 6A, when the leading edges of the positively magnetized timing segments 13 pass the synchronizing transducer there is provided a positive polarity signal, because of the fact that the rate of change of flux goes positive and then returns to zero level to remain unchanged until the end of the magnetized segment is reached, at which point a negative pulse is provided.

As a consequence, alternate positive and negative synchronizing signals are provided from the synchronizing sectors 13 on the magnetic disc 10. From these, it is desired to extract only pulses of one polarity, in order to select a desired sample group out of the two sample groups 14 in each succeeding matrix, in the present example.

Accordingly, the synchronizing sector polarity selector circuit 41 includes polarity selector shaping and clipping circuits 50 which are responsive to the synchronizing signals. The shaping and clipping circuits 50 have not been illustrated in detail, inasmuch as their function is commonly found in data processing systems. The shaping and clipping circuits 50 provide spike signal outputs in response to the synchronizing signal inputs, and direct the originally positive synchronizing signals onto one output path, and the originally negative synchronizing signals onto a different output path. Both spike output signals are, however, positive but differ in time in accordance with when the associated synchronizing input signal was provided. For aid in understanding the relationships of these signals, simplified waveforms have been provided adjacent the outputs of the shaping and clipping circuits 50 in FIG. 5. For ease in understanding the time relationships, the first pulse of a series of synchronizing signals has been designated by the numeral "1." The synchronizing signal waveform may also be seen in waveform 6A of FIG. 6.

It is desired to utilize either the originally positive synchronizing signals or the originally negative synchronizing signals to initiate the cycles of operation in the timing pulse generator 44. Therefore, one of the two separate outputs of the shaping and clipping circuits 50 is selectively gated by one of a pair of two input "AND" gates 51 and 52, the outputs of which are each coupled to an "OR" gate 53. Each of the "AND" gates 51, 52 is responsive to a different sector sample signal from the track address and control circuitry 36 of FIG. 4. These are the "Odd" or "Even" signals which determine which of the sample groups of a bit matrix is to be used to generate the error signals for the fine positioning system. As indicated generally by the fragmentary waveforms in FIG. 5, these signals may be the high and low outputs of a bistable multivibrator, used to prime the "AND" gates 51 or 52, depending upon which polarity of synchronizing signal it is desired to use. The outputs of both "AND" gates 51, 52 are passed by the "OR" gate 53 and constitute output signals from the synchronizing sector polarity selector circuits 41. These signals, and their relationship to the synchronizing signals, may be seen in waveforms B of FIG. 6. Waveform 6B illustrates the occurrence of the signals with every other synchronizing pulse, it being assumed that it is desired to use the positive synchronizing pulse, and thus to sample from the first of the sample groups 14 of a bit matrix.

Referring briefly to FIG. 2, it may be seen that there is a definite spacing between the synchronizing transducer 30 and the servo and information transducers 21 and 22. As the disc 10 rotates, the radial leading edge 15 of each sample group 14 passes under the servo transducer 22 a fixed time after the transducer 30 for the synchronizing track passes the transistion between the alternate segments 13 of the synchronizing track. Thus, there is a fixed interval of time between the synchronizing pulse and the beginning of the closest following group of servo signals during which a "get ready" cycle is initiated for the timing pulse generator 44. As may be seen by a comparison of waveform C in FIG. 6 with waveform A, the first pulse, given the numeral "2," of each sample group of signals from the servo transducer is of given polarity and occurs after the synchronizing signal. The uniform first pulse is derived from the uniform magnetization of the radial leading edge 15 of each sample group 14.

The "get ready" cycle is initiated by applying outputs from the synchronizing sector polarity selector circuits 41 to one input of a first bistable multivibrator 56. The actual cycle of operation is thereafter begun by the first subsequent pulse in the next following sample group. The first servo pulse may be considered to shut off, or reset, the first bistable multivibrator 56, thus providing at the output of the first bistable multivibrator 56 the relatively short pulse waveform shown at D in FIG. 6. The time duration represented by waveform 6D constitutes a tolerance within which there may be changes in the transducer structure, in the arrangement of the disc, or in other timing factors.

The trailing edge of the pulse thus provided from the first bistable multivibrator 56 is used to trigger a first monostable multivibrator 57. As is well known, a monostable multivibrator can provide a rectangular pulse of selected polarity and duration in response to a positive or negative going signal. Here the negative going trailing edge of the pulses from the bistable multivibrator 56 triggers the monostable multivibrator 57 and the duration of the pulse from the first monostable multivibrator 57 is used to mark the initiation of the timing pulse period for the timing pulse generator 44. The trailing edge of the pulse of the first monostable multivibrator triggers an associated second monostable multivibrator 58, which produces a pulse commencing at a time designated by numeral "3" in FIGS. 5 and 6. The output pulses from the first and second multivibrators 57 and 58 are shown in time diagram form as waveforms E and F in FIG. 6. Waveform F may be seen to extend from time "3" to time "4," which is the period in which a series of gate pulses is desired.

The gate or timing pulses from the timing pulse generator 44 are generated by using the timed output from the second monostable multivibrator 58 to trigger a gated oscillator 59. The gated oscillator 59 provides a sinusoidal output (see waveform G, FIG. 6), which in turn is converted to a square wave by wave shaping circuit 60. The frequency of the gated oscillator 59 is selected to provide a series of pulses having a periodicity like that of the pulses derived from the servo track on the recording disc. The gated oscillator 59 may be crystal controlled for stability, and the use of the "get ready" cycle eliminates the danger of erroneous signals due to lack of uniformity of initial pulses in a group.

The actual signals used for sampling are not the square waves of waveform H, but shorter pulses generated by a third monostable multivibrator 61 having a relatively short time constant. These pulses, shown as waveform J in FIG. 6, are the outputs from the timing pulse generator 44 and are generated from the negative going edges of waveform H. Both a positive and negative output is provided by means of an inverter 62 coupled to the third monostable multivibrator 61. Consequently, the output of the timing pulse generator 44 consists of two coincident series of pulses of like duration and periodicity but of opposite polarity and occurring on separate conductors. For the matrix and sampling arrangement of FIG. 2, each timing pulse sequence includes five successive pulses.

As will be understood from further details given below, it is desirable to be able to control the radial movement of the transducer heads by using the polarity of the servo output to control the direction of movement. The track address and control circuits 36 of FIG. 4 accordingly provide radial movement direction signals to the selective phase inverter circuits 45. As with the sector sample signals, the radial movement direction signals may be the high and low voltage states of a bistable multivibrator. The radial movement direction signals represent a binary choice, in that, for example, a positive signal may be arranged to position the transducers either radially inwardly or radially outwardly with respect to the disc.

In the present arrangement it has been found convenient to derive signals from the servo transducer by operating the servo transducer in the manner of a center-grounded transformer. Thus, concurrent signals of opposite polarity are generated on each of two inputs coupled to the selective phase inverter circuit 45. For the selective phase inversion by which the direction of radial movement is controlled, there is employed a group of four inhibit gates 64, 65, 66 and 67, the outputs of which are coupled to a pair of "OR" gates 68 and 69. The phase inversion is achieved by the use of what may be considered to be a cross-coupling of the inhibit gates 64—67 and the "OR" gates 68 and 69. First and second ones of the inhibit gates 64 and 65 are each responsive to the servo signals on one of the separate inputs, and the third and fourth inhibit gates 66 and 67 are responsive to the servo signals on the other of the inputs. The first and third inhibit gates 64 and 66, however, are responsive to the same radial movement direction signal. The second and fourth inhibit gates 65 and 67 are responsive to the other one of the radial movement direction signals. These radial movement direction signals are applied to the signal inhibiting inputs so that the first and third inhibit gates 64 and 66 may be inhibited or inactivated together, or the second and fourth inhibit gates 65 and 67 may be inactivated together.

The complementary nature of the servo signals on the two inputs is utilized together with the inhibit gates 64—67 to provide selected polarity outputs through the "OR" gates 68 and 69. A positive signal on one input terminal is accompanied by a negative signal on the other input terminal. Through the use of the inhibit signals, like ones of the two pairs of inhibit gates 64—67 may be employed. Because the outputs of the first and fourth inhibit gates 64 and 67 are applied to the first "OR" gate 68, and the outputs of the second and third inhibit gates 65 and 66 are applied to the second "OR" gate 69, the inhibit gate selection determines to which output terminal a given input pulse or series of pulses is directed. In consequence, the two complementary input trains of pulses may be considered to be passed directly to the corresponding outputs, or to be cross-switched between the outputs. This cross-switching effectively provides the phase inversion from the selective phase inverter circuit 45.

The servo signal outputs are illustrated as waveform C in FIG. 6. The corresponding waveforms shown at the outputs of the selective phase inverter circuit 45 in FIG. 5 are also designated as C or as waveform C (inverted).

The error sampler circuits 46 include a pulse sampler circuit 70 and an averaging and hold circuit 71. The pulse sampler circuit 70 may consist of any well known circuit for providing output signals representative of the amplitude of an input signal during a period of time established by a timing signal. Here the input signals correspond to the servo signals and the timing signals are the timing pulses. The pulse sampler circuit 70 comprises a pair of like circuits operating on the two separate trains of servo signals (C) and the two separate trains of timing pulses (J). Outputs from the pulse sampler circuit 70 are a series of pulses, coincident with the timing pulses but dependent in amplitude upon the servo signals, and are represented by waveform K in FIG. 6.

The outputs of the pulse sampler circuit 70 are applied to what may be termed an averaging and hold circuit 71. The outputs from the pulse sampler circuit 70 represent, in pulse form, the error information derived for the fine positioning portion of the system. For purposes of conversion to an analog signal, however, the averaging and hold circuit 71 may convert the individual pulses from each sample group to a steady state level, and maintain this level until the next sample group is provided. The averaging which is performed, therefore, is an averaging of groups of pulses by addition of the individual pulses, which is retained at the average level between successive sample groups. The averaging function may be performed by a signal addition or integration with time, a number of circuits for which purpose are well known. The "hold" function may be provided by a signal storage or pulse stretcher circuit of any one of a number of types employed in sampled data systems. The error signals provided from the averaging and hold circuit 71 may be applied through an error signal amplifier 72 to the associated servo amplifier of the arrangement of FIG. 4. The outputs of the error signal amplifier 72, which are the same as the outputs of the averaging and hold circuit 71, are shown as waveform L in FIGS. 5 and 6.

Here error signals, waveform L, are provided for control of the servo amplifier and for operation of the fine positioning system. It will be recognized that if the different radial movement direction signal were provided these signal waveforms L would be reversed. It should also be noted that the staircase type error signal, with intermediate hold periods at the highest level of the staircase, is provided only during the period in which the fine positioning system is bringing the system to the desired precise track location. As the system finds this track location, the error signals would of course tend toward a null.

*Comparison of Servo and Error Signals With Transducer Positions*

The arrangement of FIG. 3 represents in simplified form fragments of one matrix of the reference patterns (enlarged) together with the associated portions of the synchronizing track. Four different servo transducer positions W, X, Y and Z are shown. FIG. 6 shows, as waveforms C, the signals derived at these different servo transducer positions relative to the reference pattern. Note here that the number of magnetized segments in each sample group in FIG. 3 has been reduced, for purposes of simplicity in the illustration.

There are four different variables in this arrangement, one being the variation in the pulses provided from the synchronizing track. A second variable is in the pulse pattern provided from the servo transducer. The third variable is in the selection of either the first or the second sample group 14 of a matrix by use of the "Odd" and "Even" sector sample signals. The fourth variable is in the radial movement signal. As stated above, the radial movement signal may also be considered to be the selection of phasing of the series of timing pulses relative to the servo signals. The use of the synchronizing track output in selecting the sample group to be utilized from the matrix is evident from the description previously given. In FIG. 6 waveforms D through L illustrate the use of positive synchronizing signals to select the first sample group of a matrix.

The use of the binary selection of radial direction to achieve a null position at a desired track will be apparent from an examination of FIGS. 3 and 6. When the first sample group is chosen, for the transducer positions W through Z shown, it is accompanied by a choice of radial movement which automatically drives the system toward a null at the desired track location. In the present example, this will be referred to as a choice of the "Even" one of the radial conditions. The opposite choice, of course, is the "Odd" radial condition. In the even choice, a positive signal, when sensed in the error sampler circuits 46 during the timing pulses, is employed to drive the transducers down (as viewed in FIG. 3). A negative sensed signal is utilized to drive the transducers up. The down direction in this instance may also be considered to be the radially outward direction.

As seen in FIG. 6, when the servo transducer is at position W, the first sample group of the matrix provides a positive pulse (see waveform 3W) when the timing pulses are occurring. Accordingly, the downward direction is taken by the associated servo device, to cause the transducers to seek a null at radial position X which lies along the common boundary of the alternate magnetized elements 16. When the transducer commences operation at position X, the signal which is detected is a null (see waveform 3X) from the outset, so that the system is directly on track. For the remaining Y and Z positions of FIG. 3, the pulse which is gated out is in each instance a negative signal, and the servo drives in the up direction.

Thus, the transducers are again moved toward the null at the X position. Note that the sampling which is done is not with respect to when a magnetized or unmagnetized area is under the transducer, but with respect to the full amplitude position of the pulse provided. Because a transducer senses rate of change of flux, the full amplitude pulse is, of course, not concurrent with passage of the transducer across the magnetized or unmagnetized area. If light sensitive elements were used, however this consideration would not apply.

If the odd choice for radial selection is taken with the first sample group, a negative sensed signal moves the transducer downward, as viewed in FIG. 3 past the Z position until a null is reached at the next common boundary defining a line in FIG. 3. Accordingly, in one radial selection position, the transducers may be positioned on even numbered reference lines of the sample pattern, and in the other radial selection position, the transducers may be positioned on odd numbered reference lines of the sample pattern, with the particular reference line being determined by the coarse positioning servo system. Thus, this illustrates the fact that the radial movement direction signal controls access as well as fine positioning. There is not only positioning control, in other words, but also track selection in the fine positioning system. All that need be done is to invert the signals (waveform C in FIG. 6) from the servo transducer. If the second sample groups of the matrices are used, the operation and relationships remain the same. The difference is that the sample group offset makes available a new group of incrementally radially different track locations.

The waveforms shown in FIG. 6, of course, would not be uniform in actual practice, as the system would tend rapidly to find the null position. The arrangement does, however, illustrate the relationship between the number of radial variables and the number of circumferential variables which are possible with the present arrangement. Thus, the number of sample groups in a matrix may be increased considerably beyond two, each being radially shifted a like amount with respect to the preceding group. With this arrangement, it only remains to make the proper time selection of each sample group within the successive matrices. If, for example, there are three sample groups in each matrix, each of the sample groups will be offset one-third of the elemental radial distance of each magnetized rectangle. The null lines for the track locations will consequently be found at a spacing which is likewise one-third of the radial dimension of the rectangular elements. A desired one out of the three sample groups in the matrix must, of course, be selected by appropriate circuitry. The radial odd or even choice, however, remains the same, because the transducers can only be driven inwardly or outwardly in response to the polarity of a signal.

A random access system in accordance with the invention has been operated with fifty matrices (one hundred separate segmental reference patterns). Each of the reference patterns has had two hundred servo tracks in a 1.3 inch band. Thus, with each of seven information transducers employed in the ganged assembly there were two hundred information tracks to which it had access. The disc was rotated at 20 r.p.s., providing an error sampling rate, for fine positioning, of 1 kilocycle. The position of the servo information patterns, on the innermost radius which is used with the disc, permits the outer radial portions to be left free for higher density information recording. An extremely important feature is derived from the ganged assembly, and its relation to the servo transducer. By this arrangement seven different information storage locations are made available, each for a different head and each including two hundred information tracks. The maximum travel of the assembly is, however, only 1.3 inches. Thus, the access time for the system is appreciably reduced.

Certain other advantages are also inherent in this arrangement. Bit density resolution requirements decrease with the increasing radii of the information transducer. Further, the variation of signal amplitude with track radius is effectively minimized because of the restricted recording band covered by each transducer. The permanence of the servo information recorded in the reference patterns and in the synchronizing track makes possible the desired objective of interchangeability of the discs. In addition the positive positioning provided by the servo tracks permits the coarse positioning mechanism to operate with a relatively wide variation while exact access is still achieved to the desired track. It should be noted again that the fine positioning system provides both access and location functions, in that it selects the desired track first, and then provides a null precisely upon that track.

A number of important operative advantages are also achieved by the use of a servo system in accordance with the invention. The use of a sampled data control provides greater accuracy, because of the use of a number of individual sensing pulses to derive error information. In this connection, note that a relatively slight displacement of the servo transducers from the null position can be used to provide a full error signal and thus a very rapid final and precise correction of position.

Thus, there has ben provided an improved form of random access memory, an improved magnetic recording disc arrangement having a superior positioning system, and an improved sampled data type of control system for systems utilizing positioned transducer devices and recorded tracks of information.

Although a particular embodiment of the invention has been illustrated in the drawings and described in detail above, it is intended to be by way of example only. Accordingly, any and all modifications, variations or equivalent arrangements fully within the scope of the annexed claims should be considered to be part of the invention.

What is claimed is:

1. A random access memory system including the combination of a recording disc having a number of radially discrete reference patterns on a surface thereof, a number of mechanically coupled transducer heads movable with respect to the discs and including at least one transducer head adjacent and responsive to the reference patterns, a sampling circuit responsive to signals developed by the transducer head operative with the reference patterns for developing error signals representative of the position of the head relative to selected like ones of the radially discrete reference patterns, and a control mechanism responsive to the error signals and coupled to the transducer heads for moving the heads relative to the disc.

2. A random access memory system including the combination of a centrally rotatable recording disc having a plurality of like reference patterns arranged on the surface thereof and together defining a pattern concentric with the axis of the disc, the reference patterns being arranged in groups with the different individual ones of the groups being incrementally radially shifted with respect to the adjacent patterns, a plurality of mechanically coupled transducer heads having a fixed relation to each other, each of the transducer heads occupying a given radial position with respect to the disc, said heads being radially movable relative to the disc and including one servo transducer head in operative relation with respect to the reference patterns, a signal sampling circuit responsive to signals from the servo transducer head for providing a series of timed signals from like individual ones of the reference patterns, and a servo arrangement responsive to the successive series of timed signals for moving the transducer heads radially relative to the disc under control of the timed signals.

3. A random access memory system including the combination of a magnetizable recording disc movable along a given path and having elemental reference areas positioned parallel to the path, the reference areas including successive alternate areas of opposite magnetization characteristics, the elemental areas being divided into pattern groups which are separate along the direction of the path and incrementally shifted with respect to each other in a direction normal to the path, a number of signal transducers coupled together in fixed relation and including one magnetic transducer in operative relation with the reference patterns, and servo means including a data sampling circuit responsive to like individual ones of the reference patterns and to the signals developed by the associated transducer head from like individual positions within the reference patterns for providing positioning of the transducer heads relative to the patterns.

4. A recording and reproducing system including the combination of a rotatable information recording disc, a number of reference patterns arranged on a given circumferential area of the disc, each of the reference patterns having elemental radially disposed areas of different magnetic properties, a number of transducers having a fixed position relative to each other and radially separate relative to the disc, one of the transducers being positioned adjacent to and operative with the reference patterns, a servo device for moving the transducers, a coarse positioning system coupled to the servo device for moving the transducers to an approximate desired position relative to the disc, and a fine positioning system coupled to the servo device and to the transducer adjacent to the reference patterns for deriving signals from selected ones of the reference patterns.

5. A recording and reproducing system including the combination of a rotatable information recording disc having an information recording surface on the outer radial portions thereof and incremental reference areas on the inner radial portions thereof, the reference areas being both radially and circumferentially distinct with respect to each other, mechanically movable transducers which are fixed with respect to each other, one of the transducers being in operative relation to the reference areas and the remainder in operative relation to the information areas, and a servo system for positioning the transducers relative to the disc using the elemental areas for reference, said servo system including a sampling circuit responsive to signals from the transducer associated with the reference patterns for deriving time varying samples of the signals provided thereby.

6. A positioning system for rotatable disc memory devices including the combination of a reference pattern arrangement positioned on a radial circumference of the disc, the reference pattern consisting of segmental, radially disposed alternating magnetic and non-magnetic areas arranged substantially in a checkerboard pattern, the checkerboard pattern in one direction defining concentric recording track positions and in the other direction defining circumferential segments, each of the patterns being radially shifted with respect to the adjacent patterns thus to provide incrementally displaced concentric recording tracks, a number of transducer devices arranged in fixed relation to each other and in movable relation with respect to the reference patterns, one of the transducers being in operative relation with the reference patterns, a circuit responsive to the passage of individual reference patterns past the associated transducer for generating for each of selected ones of said reference patterns a series of pulses occurring in time relation, the amplitude of the pulses being representative of the position of the transducer relative to the reference patterns, and a servo system responsive to the groups of pulses and to signals from the reference pattern transducer for positioning the transducer devices relative to the reference pattern.

7. A system for precise positioning of transducers which are placed in an approximate position with respect to record tracks on a disc including the combination of a reference matrix consisting of at least one pair of adjacent sample group reference patterns, each of said patterns having alternating magnetic characteristics with respect to a radial direction of said disc and alternating magnetic characteristics with respect to a circumferential coordinate direction of said disc, the alternations being relatively periodic in each direction, and incrementally shifted radially between the adjacent reference patterns, a reference transducer movable to an approximate position radially with respect to the reference patterns for detecting the alternating circumferential variation provided at that position by the reference patterns, and a servo system coupled to the transducer and responsive to signals from the transducer for deriving groups of error signals responsive to individual alternating ones of the circumferential variations in a selected one of the sample group patterns of the matrix.

8. A sampled data controlled system for the radial positioning of a ganged group of transducers with respect to a magnetic disc including the combination of a plurality of checkerboard-like reference patterns positioned about an inner circumferential area of the disc, each of the reference patterns having a number of radially disposed servo tracks, each of which has alternate magnetic and non-magnetic elemental areas, the servo tracks being adjacent each other and having like selected radial dimensions, the adjacent reference patterns being radially displaced half the selected distance with respect to each other, two of the reference patterns defining a matrix and each of the reference patterns having a uniformly magnetized radial boundary at the leading edge thereof taken with respect to the direction of rotation of the disc, a servo transducer radially mounted for movement with respect to the disc and operatively coupled to the reference patterns of the disc, the remainder of the ganged group of transducers having a fixed spatial relation with respect to the servo transducer, a synchronizing track defined by segments of different magnetization on said disc at a radius less than the radius of the reference patterns, each of the segments being associated with a like sample group within a different matrix, a fixed synchronizing transducer in operative relation with the synchronizing track, a sector selector circuit responsive to signals from the synchronizing transducer for providing timing signals controllably responsive to pulses of selected polarity from the synchronizing transducer, a circuit responsive to leading edge signals from the reference pattern transducer and to signals of the selected polarity from the synchronizing transducer for providing a series of timed gating pulses for a selected time duration, circuit means repsonsive to the timed gating pulses for providing alternatively a different series of phase displaced signals, the phase displaced signals having a half cycle phase difference with respect to the periodicity of the alternating reference pattern areas, an error signal sampling circuit responsive to the reference pattern signals and to a selected one of the series of timed gating pulses for providing a substantially continuous servo control signal indicative in polarity and amplitude of the signals provided from the reference pattern transducer during the period in which the timed gating signals are provided, and a servo device coupled to the transducer heads and responsive to the servo control signal for moving the transducer heads to a radial position at which a substantial null exists during the time a sample group of signals is taken from individual unique ones of the reference patterns for the different matrices about the disc.

9. A magnetic recording medium including the combination of a planar disc having magnetizable material supported thereon, a selectively positioned group of relatively small magnetizable elemental surface areas embedded in the surface of the disc, the elemental areas being disposed to define reference pattern segments which are elongated in the radial direction with respect to said disc and circumferentially placed concentric with the disc at a given radius on an inner radial portion of the disc, and the elemental areas of each reference pattern varying in position alternately in both the radial and the circumferential directions, with the radial variation providing a selected incremental radial displacement between adjacent reference patterns.

10. A disc for recording in tracks about a central axis including the combination of a timing track consisting of spaced magnetizable segments arranged in a circle on one radius of the disc, a number of angularly spaced reference patterns in a given area concentric with the disc, each of the reference patterns consisting of alternating elemental areas of magnetic and non-magnetic material defining radial and circumferential lines with respect to the disc, successive ones of the reference patterns being arranged in groups, and each individual pattern in a group being radially spaced with respect to the adjacent patterns.

11. A recording member including the combination of a planar disc having a central axis, magnetizable elements defining a timing track disposed in a circle on one radius of the disc, the magnetizable elements being imbedded in the surface thereof, a plurality of angularly separate reference patterns of like configuration disposed about the disc and concentric therewith, each of the reference patterns being defined by a plurality of elemental magnetizable units in the surface of the disc.

12. A servo system for positioning a group of transducers relative to a recording disc having a reference pattern of radially and circumferentially varying characteristics about a given radius thereof including the combination of a servo transducer in operative relation to the reference pattern, a servo device coupled to the servo transducer and the group of transducers for changing the radial position thereof relative to the disc, a coarse positioning circuit responsive to the position of the servo device and to approximate desired location signals for controlling the operation of the servo device, a fine positioning circuit couple to the servo transducer, the fine positioning circuit deriving groups of sample error signals from the signals provided by the servo transducer, a circuit for detecting the presence of a null in the coarse positioning circuit, and switching means responsive to the detection of the presence of a null and coupled to both the coarse and fine positioning circuits for switching the servo device to the fine positioning circuit when the approximate position has been reached.

13. A system for positioning transducer members precisely relative to a recording medium, and for selecting desired ones of adjacent tracks, which tracks are recorded along a given coordinate direction including the combination of a plurality of reference patterns positioned in the recording medium along the given coordinate direction thereof, said reference patterns having elemental surface areas of opposite electrical characteristics on opposite sides of reference lines which are parallel to the given coordinate direction, the surface areas being disposed to have opposite characteristics also along the given coordinate direction, at least a pair of transducers which are coupled together in fixed relation, one of which cooperates with the recording medium and the other of which cooperates with the reference patterns, and circuit means coupled to the reference pattern transducer for deriving timed pulses from the signals provided thereby when the recording medium is moved relative to the heads along the given coordinate direction, the timed signals being taken relative to the incremental areas of the reference pattern and representing in amplitude and polarity the amount of correction which is needed to bring the transducer assembly to the desired position line.

References Cited in the file of this patent

UNITED STATES PATENTS

| | | |
|---|---|---|
| 2,729,214 | Broekhuysen et al. | Jan. 3, 1956 |
| 2,733,425 | Williams | Jan. 31, 1956 |
| 2,797,402 | Duffey et al. | June 25, 1957 |